United States Patent [19]
Nitta et al.

[11] Patent Number: 5,770,173
[45] Date of Patent: Jun. 23, 1998

[54] METHOD OF PRODUCING CATHODE ACTIVE MATERIAL FOR NON-AQUEOUS ELECTROLYTE SECONDARY BATTERY

[75] Inventors: Yoshiaki Nitta, Hirakata; Masatoshi Nagayama; Tomoaki Seo, both of Neyagawa, all of Japan

[73] Assignee: Matsushita Electric Industrial Co., Ltd., Osaka-fu, Japan

[21] Appl. No.: 607,544

[22] Filed: Feb. 27, 1996

[30] Foreign Application Priority Data

Mar. 3, 1995 [JP] Japan ..................... 7-044052

[51] Int. Cl.$^6$ .......... C01G 45/12; C01G 51/00; C01G 53/00
[52] U.S. Cl. .......... 423/593; 423/594; 423/599
[58] Field of Search .................. 423/605, 593, 423/594, 599

[56] References Cited

U.S. PATENT DOCUMENTS

| | | | |
|---|---|---|---|
| 2,042,814 | 6/1936 | Vadner | 423/605 |
| 4,277,360 | 7/1981 | Mellors et al. | 423/605 |
| 4,959,282 | 9/1990 | Dahn et al. | 423/599 |
| 5,180,574 | 1/1993 | von Sacken | 423/594 |
| 5,266,299 | 11/1993 | Tarascon . | |
| 5,630,993 | 5/1997 | Amatucci et al. | 423/593 |

FOREIGN PATENT DOCUMENTS

| | | |
|---|---|---|
| 0 279 235 A1 | 8/1988 | European Pat. Off. . |
| 0 624 552 A1 | 11/1994 | European Pat. Off. . |
| A 04 115459 | 4/1992 | Japan . |
| 6-349494 | 12/1994 | Japan . |

OTHER PUBLICATIONS

Tsutomu Ohzuku et al.; "LiMnO$_2$ as Cathode for Secondary Lithium Cell"; *Chemistry Express*, vol. 7, No. 3, Kinki Chemical Society, Japan; pp. 193–196 (1992).

*Primary Examiner*—Wayne Langel
*Attorney, Agent, or Firm*—Panitch Schwarze Jacobs & Nadel, P.C

[57] ABSTRACT

In producing a cathode active material for a non-aqueous electrolyte secondary battery, an hydroxide or an oxyhydroxide of a 3d transition metal, e.g., MnOOH is exposed to an atmosphere of saturated water vapor containing alkali metal ions in a water mist preferably in a pressurized condition, so that the water mist substitutes the alkali metal ions for protons contained in the hydroxide or the oxyhydroxide.

8 Claims, 4 Drawing Sheets

METHOD OF PRODUCING CATHODE ACTIVE MATERIAL FOR NON-AQUEOUS ELECTROLYTE SECONDARY BATTERY

BACKGROUND OF THE INVENTION

1. Field of the Invention

The present invention relates to a method of producing a cathode active material for a non-aqueous electrolyte secondary battery.

2. Description of the Prior Art

As a cathode active material for a non-aqueous electrolyte secondary battery, composite oxides containing Li such as $LiCoO_2$, $LiNiO_2$, $LiMnO_2$, etc. are well known in the art.

Researches have been made vigorously on a nonaqueous electrolyte secondary battery with a combination of such a cathode active material and an anode active material, e.g., a carbon compound being capable of intercalation and deintercalation of Li because it has a high voltage and a high energy density.

Conventionally, a cathode active material is produced by the methods as mentioned below. For example, a method of producing $LiMnO_2$ is known from a report in Chemistry Express, vol.7, pp. 193–196 (1992). This method obtains $LiMnO_2$ by baking a mixture of $LiOH \cdot H_2O$ and $\gamma$-$MnOOH$ at 450° C. in an atmosphere of nitrogen gas. To increase charge or discharge capacity of a cathode active material, homogeneity and high purity are required for the active material. In the use of this method, it is required to mix a $LiOH \cdot H_2O$ powder and a $\gamma$-$MnOOH$ powder uniformly at a stoichiometrically correct mixture rate even to extremely small microscopic local areas, before baking to enable uniform reaction. If the homogeneity of the mixture is not enough before baking, there is a possibility that undesirable materials are produced or starting raw materials remain. As a result, electrochemical activity of the obtained active material is lowered.

To solve these problems for using the powder raw materials, Japanese Unexamined Publication Tokkai Hei 6-349494 (hereinafter referred to as "'494") discloses a method to substitute Li ions for protons contained in $\gamma$-$MnOOH$ by immersing a $\gamma$-$MnOOH$ powder into an LiOH aqueous solution, followed by boiling the resultant suspension for a certain time and heating the wet powder obtained by removing a supernatant of the suspension in an atmosphere of argon gas. However, according to this method, the process of boiling the powder so as to react and the process of heating the wet powder must be performed separately. Therefore, this method has a draw back that the process is complex and low in efficiency of production.

In the case using an LIOH aqueous solution, because of limited solubility of LiOH, reaction rate of lithiation of $\gamma$-$MnOOH$ is low.

SUMMARY OF THE INVENTION

The object of the present invention is to simplify a process of producing an active material derived from reaction between a hydroxide or an oxyhydroxide of a 3d transition metal such as $\gamma$-$MnOOH$ and an alkali metal compound such as LiOH.

Another object of the present invention is to provide a cathode active material having a uniform composition and a large capacity by improved efficiency of reaction between the hydroxide or the oxyhydroxide of 3d transition metal and the alkali metal compound.

The present invention provides a method of producing a cathode active material for a non-aqueous electrolyte secondary battery, comprising the step of exposing a hydroxide or an oxyhydroxide of a 3d transition metal to an atmosphere of saturated water vapor including dispersion water mist containing alkali metal ions to substitute the alkali metal ions for protons contained in the hydroxide or the oxyhydroxide.

The present invention further provides a method of producing a cathode active material for a non-aqueous electrolyte secondary battery, comprising the steps of;

preparing a mixture of an alkali metal compound and at least one compound selected from the group consisting of a hydroxide and an oxyhydroxide of a 3d transition metal and exposing said mixture to an atmosphere of saturated water vapor, to dissolve the alkali metal compound in a water mist dispersing in the water vapor and to substitute alkali metal ions contained in the water mist for protons contained in the hydroxide or the oxyhydroxide.

According to the present invention, a supply of saturated water vapor including a water mist containing alkali metal ions on a solid surface of a hydroxide or an oxyhydroxide of a 3d transition metal causes buffer effect of redox reaction that is reaction of detaching protons exposed on the surface of the hydroxide or the oxyhydroxide, thereby to cause the alkali metal ions contained in the water vapor to compensate an electric charge caused by the detachment of the protons continuously.

When the alkali metal ions dissolved in the water mist dispersed in the water vapor are used for the reaction, reaction rate becomes higher in comparison with an ordinary reaction in the solid-liquid system. It is assumed that this is because the alkali metal ions in the water mist have a higher degree of freedom in motion than in the liquid phase water, and that the alkali metal ions easily collide with the hydroxide or the oxyhydroxide in comparison with the reaction in the solid-liquid system and alkalinization of the hydroxide or the oxyhydroxide is promoted. Furthermore, because this reaction resembles the reaction in the solid-gas system, concentration polarization which is observed in a liquid at ordinary solid-liquid reaction is unlikely to occur.

It is preferable that the exposing step is performed under pressurized condition. By performing the step under the pressurized condition, it becomes possible to realize a higher concentration of alkali metal ions in the water mist. When the boiling point is raised by pressurization, the solubility increases. For example, it is possible to raise the solubility of LiOH in water higher than 6 mol/L that is the saturated solubility of LiOH in water under normal pressure at 100° C. Furthermore, by raising the boiling point, saturation humidity becomes surprisingly higher. If saturation humidity is well regulated, it is possible to control frequency of collision of the alkali metal ions with the solid surface, corresponding to the reaction rate.

It is preferable that the alkali metal ions are Li ions.

The oxyhydride of 3d transition metal compound is preferably MnOOH.

It is preferable that the water mist contains the alkali metal ions at a concentration of more than 6 mol/L in a liquid phase water.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

The preferred embodiments of the present invention are explained with referring to the figures.

In concrete, the method of using γ-MnOOH is explained as follows.

This is a method to obtain a cathode active material represented by a general formula of LiMnO$_2$. The method uses the buffer effect of the redox reaction which performs detachment of protons contained in γ-MnOOH and compensation of an electric charge caused by the detachment with Li ions contained in a water mist on the detached surface of the γ-MnOOH continuously by exposing γ-MnOOH to an atmosphere of saturated water vapor at a temperature over 100° C wherein a water mist containing Li ions originated from LiOH is dispersed.

Essentially, hydroxyl groups are exposed on a solid surface of a hydroxide or an oxyhydroxide. Therefore, depending on an environment of the solid, the solid causes the buffer effect of the redox reaction namely a detachment of protons or hydroxyl groups. If the environment has acidity, the solid detaches hydroxyl groups; and if the environment has alkalinity, the solid detaches protons. The present invention uses this characteristic of detachment of protons present on the solid surface by collision with a water mist containing alkali metal ions in a water vapor and compensation of an electric charge of the solid caused by the detachment of the protons with the alkali metal ions. When the water mist containing the alkali metal ions collides with the solid, the hydroxyl group in the water mist attacks the proton to incorporate it inside the water mist. Simultaneously, the solid takes up a stoichiometrically correct amount of the alkali metal ions. As a result, the alkali metal ions in the water mist substitute for the protons in the solid.

FIRST EMBODIMENT

The method of producing a cathode active material is explained as follows. In this embodiment, an aimed active material is LiMnO$_2$.

Figure 1:
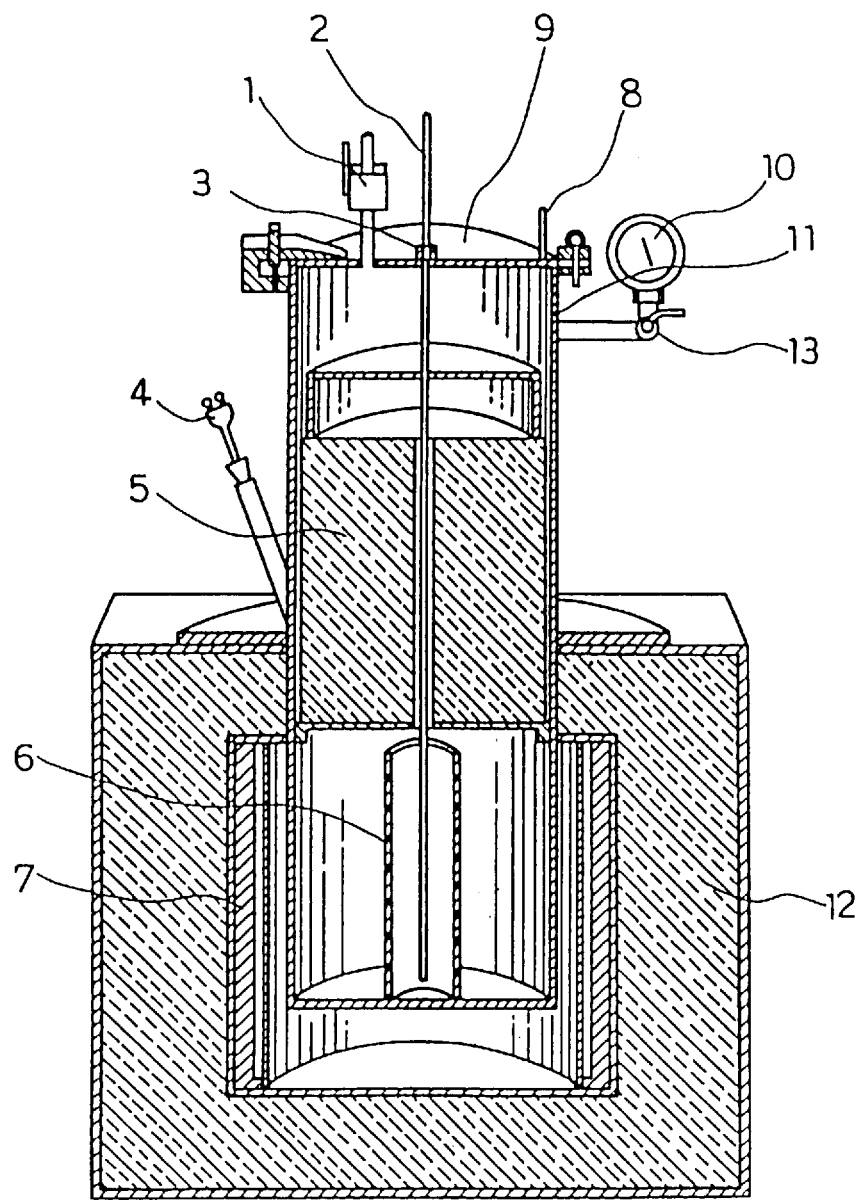
FIG. 1 shows a vertical cross-sectional view of the apparatus for producing a cathode active material in accordance with the present invention.

FIG. 1 shows a producing apparatus used in this embodiment. A container 11 of a stainless steel is placed at a position a few cm upper from the bottom of a cylindrical hollow surrounded by ceramic heat insulators 5 and 12. Water is supplied through a pipe 2 into the container 11 from outside of the apparatus. A rubber cork 3 seals a gap between the pipe 2 and a lid 9 of a stainless steel. A pipe 6 for distribution of water vapor is placed in the container 11. The container 11 is closed airtightly by shutting the lid 9 with a nub 8. Numeral 1 denotes a valve for evacuating an inner gas. A sample placed in the container 11 is heated by a kanthal heater 7. Temperature and pressure in the container 11 are measured by a thermocouple 4 and a pressure gauge 10, respectively. Numeral 13 denotes a valve for supplying a gas.

Previously, γ-MnOOH and LIOH pulverized to a powder having a particle diameter of under 100μm have been mixed at a proper molar ratio for producing LiMnO$_2$. The mixture is placed with care of preventing to contact with water on a boat of alumina and placed at a position about 2 cm upper from the bottom of the container 11 and then the lid 9 is closed airtightly. Before closing the lid 9, about 10 cc of water is added into the container 11.

Then, the kanthal heater 7 is turned on to heat the inside of the container 11. The temperature and the pressure in the container 11 are monitored by the thermocouple 4 and the pressure gauge 10, respectively, and when the temperature reaches 100° C or therearound a supply of drops of water into the container 11 is started.

In the case that a water vapor is saturated under normal pressure, saturation humidity is 17.05 [water vapor/dry air by weight]. Under this condition, the water vapor causes LiOH deliquescene and a water mist containing Li ions at a high concentration is generated around γ-MnOOH at a high temperature, since the γ-MnOOH has been mixed with the LiOH. Then starts the reaction, that is, a substitution of the Li ions for the protons caused by buffer effect of redox reaction on the solid surface.

For accelerating the reaction, it is effective to raise the saturation humidity in the container 11 by heating, or to cover the surrounding of the mixture with a shield having openings through which the water mist can pass.

Figure 2:
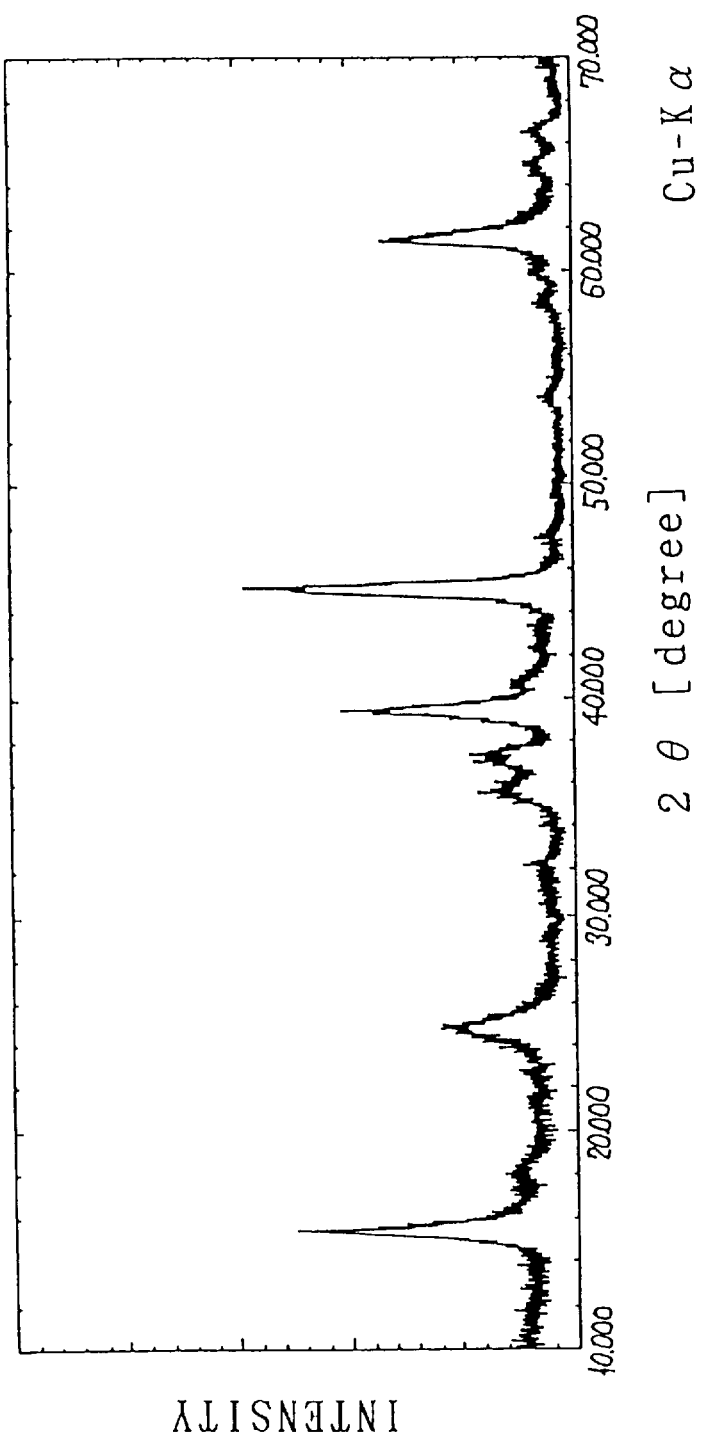
FIG. 2 shows an X-ray diffraction pattern of LiMnO$_2$ obtained by the method of the first embodiment in accordance with the present invention.

Under this condition, the aimed orthorhombic LiMnO$_2$ was obtained by the treatment for 3 hours. A diffraction pattern in powder X-ray method for the obtained material is shown in FIG. 2. As shown in FIG. 2, the aimed orthorhombic LiMnO$_2$ was obtained.

SECOND EMBODIMENT

Using the same apparatus as in the abovementioned embodiment, by performing the treatment at a temperature of 132° C under a pressure of 3.0 kgf/cm$^2$ (corresponding to a gauge pressure of 2.0 kgf/cm$^2$), the aimed orthorhombic LiMnO$_2$ was obtained in about 2 hours. Then, the saturation humidity is 68.13. In this embodiment, the applied pressure was 3.0 kgf/cm$^2$ of in consideration of the durability of the apparatus. It is possible to perform the same treatment under a further pressurized condition having an increased humidity, in dependence on durability of a producing apparatus.

In accordance with the present invention, any other process such as baking is not required and the procedure is completed with the above process alone.

Since an active material is produced in these methods, a content of protons inherently contained in a starting raw material of is an extremely important factor. Therefore, a γ-MnOOH powder containing protons 1% by weight or higher was selected in the first and the second embodiments. If the amount of proton is extremely small, the manganese compound can not take up an efficient amount of Li ions. Since the reaction advances in accordance with the chemical equilibrium theory, it is considered that the reaction rate is lowered after the reaction has advanced to some extent. There occurs no problem if the treatment is performed under normal pressure or higher; however it is preferable to perform the process in a further pressurized environment.

Hereafter, the method of the present invention is explained in comparison with the conventional method.

FIRST COMPARATIVE EMBODIMENT

Figure 3:
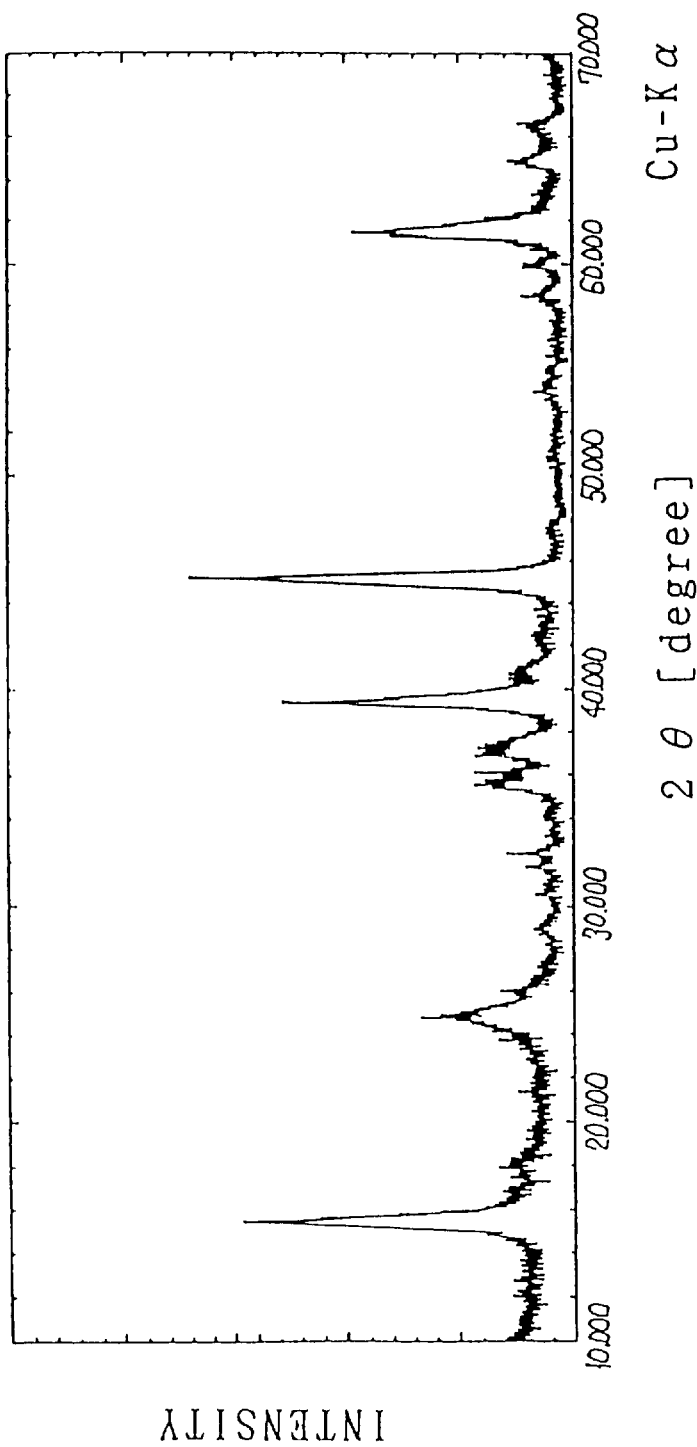
FIG. 3 shows an X-ray diffraction pattern of LiMnO$_2$ obtained by the method of the first comparative embodiment.

As a reference, LiMnO$_2$ was produced in a solidliquid system in accordance with the method disclosed in '494. At first, γ-MnOOH is added to a saturated LiOH aqueous solution. The suspension thus obtained was boiled for six hours, and then centrifuged to obtain a wet powder. Then, the obtained powder was disposed on an alumina boat and heated at 200° C in an atmosphere of argon gas to obtain an aimed $LiMnO_2$. An X-ray diffraction pattern in the powder method for the obtained powder is shown in FIG. 3. It is apparent from FIG. 3 that the diffraction pattern for the powder shows substantially the same pattern as that for the powder obtained in the first embodiment, suggesting that the powder of this embodiment also has the orthorhombic system. Furthermore, the powders obtained by both methods have an equivalent electrochemical activity.

According to this method, a heat treatment is required after the step of reaction in the solid-liquid system wherein the Li ions are substituted for the hydroxyl groups in the γ-MnOOH. Consequently, a relatively long time period is required for producing an active material compared with the method of the present invention. Therefore the method of the present invention allows simplification of the process, thereby realizing a shorter processing time as a whole.

SECOND COMPARATIVE EMBODIMENT

In the same way as the first comparative embodiment using the solid-liquid system, $LiMnO_2$ was produced under a pressure of 3 $kgf/cm^2$ (corresponding to a gauge pressure of 2 $kgf/cm^2$). In this method, the powder must be boiled for 3 hours or longer to obtain a cathode active material equivalent to that of the present invention.

According to this method, the reaction rate was higher than that in the first comparative embodiment, but lower than that in the first embodiment of the present invention. This may be because the reaction is restricted by concentration polarization which occurs in the solution.

In addition, heat treatment is required after the solid-liquid reaction.

THIRD COMPARATIVE EMBODIMENT

Figure 4:
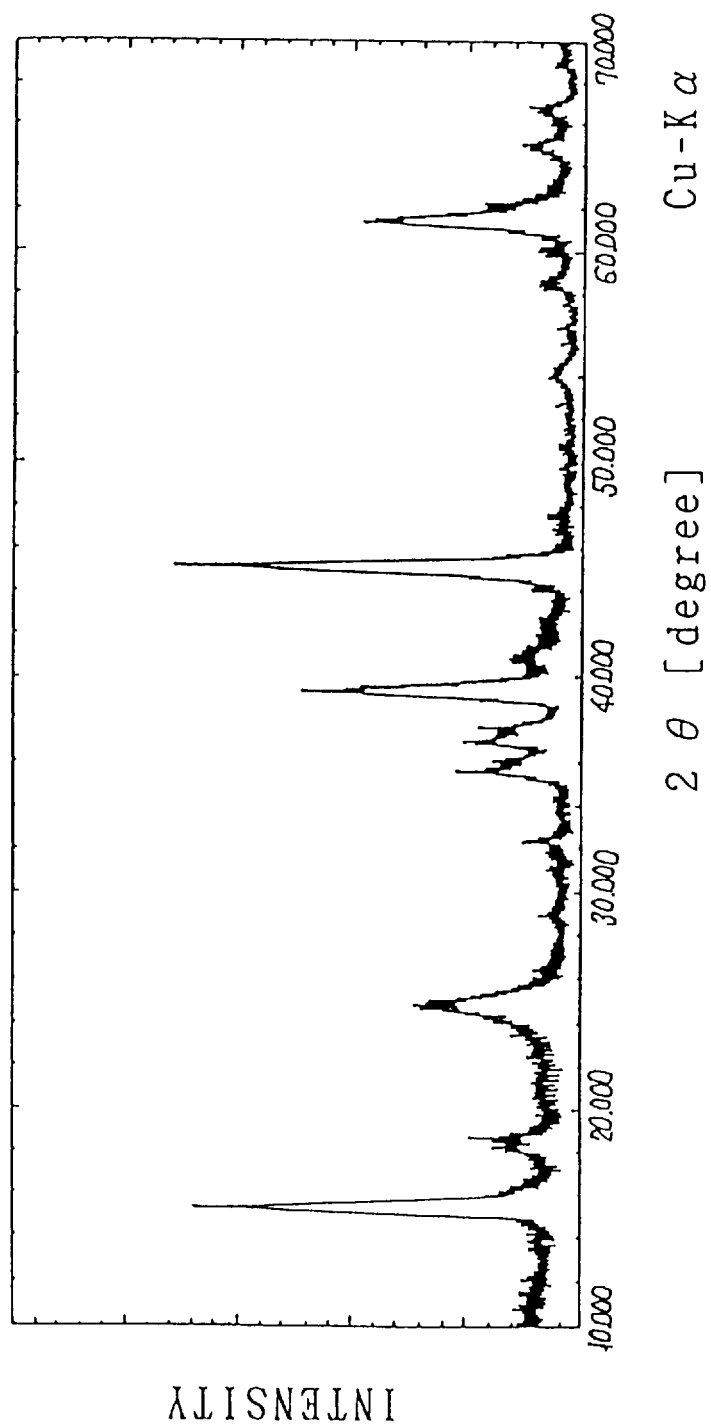
FIG. 4 shows an X-ray diffraction pattern of LiMnO$_2$ obtained by the method of the third comparative embodiment.

In the case of producing $LiMnO_2$ by the conventional method in the solid-solid reaction system, a mixture of γ-MnOOH and LiOH must be heat-treated at 450° C. for several hours in an atmosphere of nitrogen gas. In this method, the obtained powder is contaminated with oxide other than the orthorhombic $LiMnO_2$, as shown by the X-ray diffraction pattern in FIG. 4. It was confirmed that the electrochemical activity of the obtained powder was low by about 10% in comparison with that in the embodiments of the present invention.

As mentioned above, according to the present invention, a process of producing a cathode material is simplified and a productivity of $LiMnO_2$ is improved because the reaction rate becomes higher.

In the above embodiments, γ-MnOOH was used as a solid to accept the substitution of alkali metal ions for protons. The same effect was obtained by using a hydroxide or an oxyhydroxide of Ni, Co or Fe, or hydroxide or the other oxyhydroxide of Mn instead of γ-MnOOH. Furthermore, a mixture or a solid solution of these compounds also caused the same effect.

As mentioned above, according to the present invention, a composite oxide containing alkali metal ions is produced only by the step of supplying water vapor, including dispersed water mist containing the alkali metal ions on the surface of the hydroxide or the oxyhydroxide, thereby to substitute the alkali metal ions for the protons in the solid. The present invention can realize a high reaction rate. No other steps are required after this step. Therefore, the process is simplified.

Thus, according to the present invention, an active material having a high quality can be produced efficiently.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of producing a cathode active material for a non-aqueous electrolyte secondary battery, comprising the step of exposing a hydroxide or an oxyhydroxide of a 3d transition metal to an atmosphere of saturated water vapor including dispersed water mist containing lithium metal ions to substitute said lithium ions for protons contained in said hydroxide or said oxyhydroxide.

2. The method of producing a cathode active material for a non-aqueous electrolyte secondary battery in accordance with claim 1, wherein said exposing step is performed under pressurized condition.

3. The method of producing a cathode active material for a non-aqueous electrolyte secondary battery in accordance with claim 1, wherein said oxyhydroxide is MnOOH.

4. The method of producing a cathode active material for a non-aqueous electrolyte secondary battery in accordance with claim 1, wherein said water mist contains said lithium ions at a concentration of more than 6 mol/L in liquid phase.

5. A method of producing a cathode active material for a non-aqueous electrolyte secondary battery, comprising the steps of;

preparing a mixture of a lithium compound and at least one compound selected from the group consisting of a hydroxide and an oxyhydroxide of a 3d transition metal and exposing said mixture to an atmosphere of saturated water vapor, to dissolve said lithium compound in a water mist dispersing in said water vapor and to substitute lithium ions contained in said water mist for protons contained in said hydroxide or said oxyhydroxide.

6. The method of producing a cathode active material for a non-aqueous electrolyte secondary battery in accordance with claim 5, wherein said exposing step is performed under pressurized condition.

7. The method of producing a cathode active material for a non-aqueous electrolyte secondary battery in accordance with claim 5, wherein said oxyhydroxide is MnOOH.

8. The method of producing a cathode active material for a non-aqueous electrolyte secondary battery in accordance with claim 5, wherein said water mist contains said alkali metal ions at a concentration of more than 6 mol/L in liquid phase.

* * * * *